US007243844B2

(12) United States Patent
Weisblatt et al.

(10) Patent No.: US 7,243,844 B2
(45) Date of Patent: Jul. 17, 2007

(54) POINT OF SALE INTEGRATOR

(75) Inventors: Karen Weisblatt, Austin, TX (US); John Michael Adams, Austin, TX (US); Michael Gray, Austin, TX (US); Kuoyong Huang, Cedar Park, TX (US); Brian Slaughter, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 42 days.

(21) Appl. No.: 11/270,262

(22) Filed: Nov. 9, 2005

(65) Prior Publication Data

US 2007/0102514 A1 May 10, 2007

(51) Int. Cl.
*G06K 75/00* (2006.01)

(52) U.S. Cl. ...................... 235/383; 235/379; 235/381; 235/475

(58) Field of Classification Search ........ 235/383–384, 235/381, 379, 475; 705/14–16
See application file for complete search history.

(56) References Cited

U.S. PATENT DOCUMENTS

| | | | | |
|---|---|---|---|---|
| 4,803,346 | A * | 2/1989 | Lyons et al. | 235/7 R |
| 4,937,744 | A * | 6/1990 | Ball | 705/18 |
| 5,079,412 | A * | 1/1992 | Sugiyama | 235/383 |
| 5,113,060 | A | 5/1992 | Wike, Jr. et al. | 235/383 |
| 5,162,639 | A | 11/1992 | Sugiyama | 235/383 |
| D365,595 | S | 12/1995 | Trobert | D18/4 |
| D377,366 | S * | 1/1997 | Sato | D18/4 |
| 5,756,978 | A | 5/1998 | Soltesz et al. | 235/380 |
| 5,859,779 | A | 1/1999 | Giordano et al. | 364/479.01 |
| 5,927,878 | A * | 7/1999 | Kasai et al. | 400/691 |
| 5,943,208 | A * | 8/1999 | Kato et al. | 361/685 |
| 6,223,163 | B1 | 4/2001 | Van Luchene | 705/1 |
| 6,598,024 | B1 | 7/2003 | Walker et al. | 705/16 |
| 6,637,661 | B2 | 10/2003 | Cohen et al. | 235/472.01 |
| D493,815 | S | 8/2004 | Giordano et al. | D18/4.6 |
| 6,858,856 | B2 * | 2/2005 | Balog et al. | 250/556 |
| 6,917,299 | B2 | 7/2005 | Fu et al. | 340/686.1 |
| 7,070,105 | B2 * | 7/2006 | Gatto et al. | 235/462.13 |
| 2005/0283403 | A1 * | 12/2005 | Ramirez et al. | 705/16 |

OTHER PUBLICATIONS http://www.mobileplanet.com/product.asp?dept_id=5040&pf_id=MP95-0539&hp_id; *Mobile Planet* "Enfora Treo 600 Wi-Fi Sled", Feb. 15, 2006 (3 pages).

http://www.detnews,com/2005/autosconsumer/0503/30/G03-133160.htm: *The Detroit News Drive* "Sliding Tray Eases Loading" Feb. 15, 2006 (2 pages).

http://www.ncr.com NCR "NCR RealPOS™ 80 POS Terminal" 2004 (4 pages).

* cited by examiner

*Primary Examiner*—Eliseo Ramos-Feliciano
*Assistant Examiner*—Tuyen Kim Vo
(74) *Attorney, Agent, or Firm*—Hamilton & Terrile, LLP; Stephen A. Terrile

(57) ABSTRACT

The point of sale terminal includes a terminal housing with a controller portion and a cash drawer portion, a sliding sled coupled to the terminal housing residing within the controller portion of the terminal housing and between a first position and a second position wherein the first position is within the controller portion of the terminal housing and the second position is without the controller portion of the terminal housing, and a system controller coupled to the sliding sled such that when the sliding sled is without the controller portion of the terminal housing, the system controller is exposed for service.

15 Claims, 4 Drawing Sheets

POINT OF SALE INTEGRATOR

BACKGROUND OF THE INVENTION

1. Field of the Invention

The present invention relates to point of sale terminals and more particularly to accessing electronics within the point of sale terminal.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a point of sale (POS) terminal. A point-of-sale terminal is a computerized replacement for a cash register. A point of sale terminal can include the ability to record and track customer orders, process credit and debit cards, connect to other systems in a network, and manage inventory. Generally, a point of sale terminal has as its core an information handling system, which is provided with application specific programs and I/O devices for the particular environment in which the point of sale terminal will serve. A point of sale system for a restaurant, for example, is likely to have all menu items stored in a database that can be queried for information in a number of ways. Point of sale terminals are used in most industries that have a point of sale such as retail stores, restaurants, and lodging.

Known point of sale solutions that are available in the market today are often difficult to service in retail environments. To access the information handling system of the point of sale terminal, it is often necessary to move or rotate the entire terminal. Known point of sale solutions only provide access to point of sale controller from the back of the point of sale terminal.

Additionally, point of sale keyboards are often very expensive. There are two features that make point of sale keyboards unique to most retailers, most of the keyboards include a magnetic stripe reader/credit card reader (MSR) and some keyboards include reprogrammable/relegendable keys. This feature is waning driven partially by the availability of low cost touch screen solutions.

SUMMARY OF THE INVENTION

In accordance with the present invention, a point of sale terminal is provided within includes a housing that includes a drawer mechanism for sliding the information handling portion of the point of sale terminal. In this way when the information handling system portion of the point of sale terminal requires, service, it is not necessary to remove or rotate the entire point of sale terminal. The design of the present point of sale terminal reflects extensive feedback from customers.

The design of the point of sale terminal provides a favorable point of sale form factor. Additionally, the point of sale terminal integrates well with known small form factor information handling system chassis such as the SX280 chassis available from Dell, Inc.

The point of sale terminal includes a sliding tray that provides front, top and back serviceability access for the information handling system. The point of sale terminal also includes a keyboard sled with modular MSR and a minimal edge keyboard.

With respect to the serviceability enhancing sliding tray the CPU and powered USB hub sit on a gliding tray above a cash drawer portion of the point of sale terminal. The gliding tray can extend beyond the cash drawer to provide easy access to the point of sale information handling system from the front of the housing of the point of sale terminal. The tray slides out beyond the edge of the cash drawer to provide line of sight to the rear ports on the point of sale controller. This enables retailer help desks to easily troubleshoot point of sale terminal problems with the sales associates in stores. Thus, the point of sale terminal provides front, top and back access to the point of sale controller.

With respect to the keyboard sled with modular MSR and minimal edge keyboard, the point of sale terminal keyboard includes a sled (e.g., a plastic sled) which exactly fits the space remaining on top of the cash drawer housing creating the illusion of an integrated solution, while preserving all of the benefits of a modular approach. The sled also include a recess into which an MSR can be snapped from underneath. By providing a modular keyboard approach, the cost of a point of sale keyboard is dramatically reduced in environments where relegendable reprogrammable keys are not desired.

More specifically, in one embodiment, the invention relates to a point of sale terminal which includes a terminal housing with a controller portion and a cash drawer portion, a sliding sled coupled to the terminal housing residing within the controller portion of the terminal housing and between a first position and a second position wherein the first position is within the controller portion of the terminal housing and the second position is without the controller portion of the terminal housing, and a system controller coupled to the sliding sled such that when the sliding sled is without the controller portion of the terminal housing, the system controller is exposed for service.

In another embodiment, the invention relates to an information handling system which includes a terminal housing, the terminal housing including a controller portion and a cash drawer portion, a sliding sled coupled to the terminal housing, the sliding sled residing within the controller portion of the terminal housing, the sliding sled sliding between a first position and a second position, the first position being within the controller portion of the terminal housing and the second position being without the controller portion of the terminal housing, and a system controller coupled to the sliding sled such that when the sliding sled is without the controller portion of the terminal housing, the system controller is exposed for service.

In another embodiment, the invention relates to a point of sale terminal which includes a terminal housing, the terminal housing including a controller portion and a cash drawer portion, a sliding sled coupled to the terminal housing, the sliding sled residing within the controller portion of the terminal housing, the sliding sled sliding between a first position and a second position, the first position being within the controller portion of the terminal housing and the second position being without the controller portion of the terminal housing, a rear panel coupled to the terminal housing, the rear panel being removable to provide access to a rear of the controller portion and the cash drawer portion of the terminal housing, a face panel coupled to the terminal housing, the face panel being removable to provide access to a front of the controller portion of the terminal housing and to provide the sliding sled access to the second position, and a system controller coupled to the sliding sled such that when the sliding sled is without the controller portion of the terminal housing, the system controller is exposed for service.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
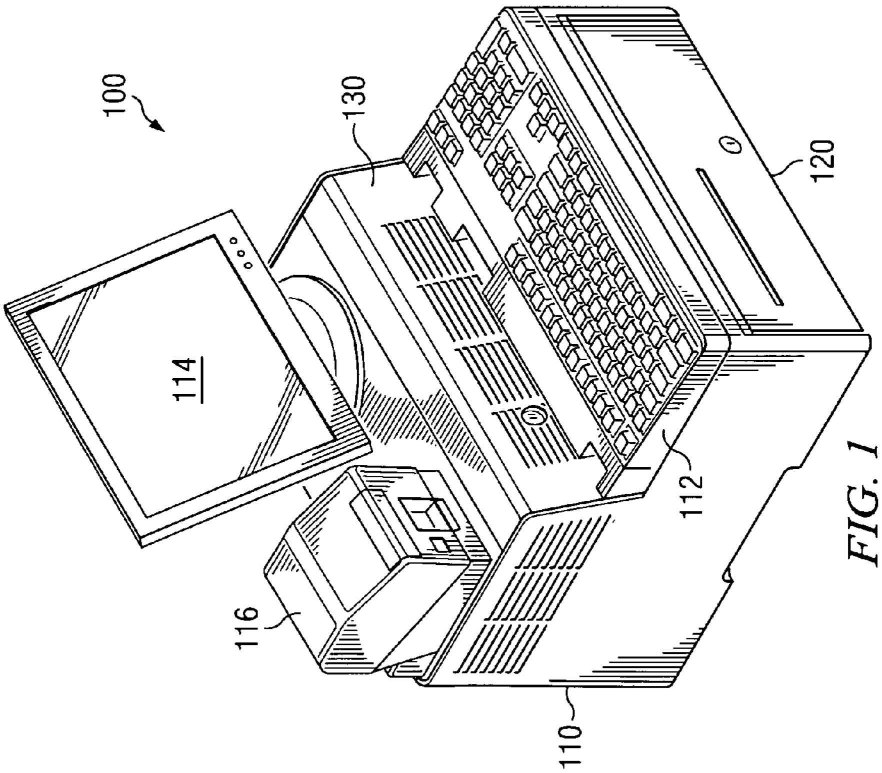
FIG. 1 shows a perspective view of a point of sale terminal in accordance with the present invention.

Referring to FIG. 1, a perspective view of a point of sale terminal 100 in accordance with the present invention is shown. More specifically, the point of sale terminal 100 includes terminal housing 110, a keyboard 112, a monitor 114 and a printer 116. The housing 110 includes a cash drawer 120 as well as a removable face panel 130. The form factor of the terminal housing 110 is such that the monitor 114 and the printer 116 fit comfortably on top of the terminal housing 110.

Figure 2:
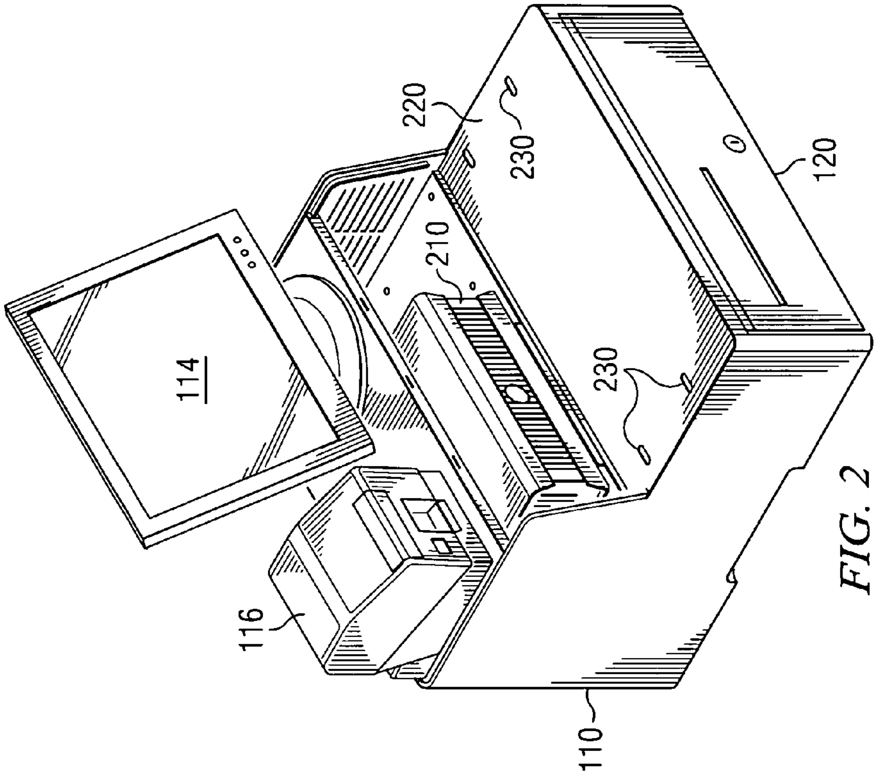
FIG. 2 shows a perspective view of a point of sale terminal with the front of the controller accessible.

Referring to FIG. 2, a perspective view of a point of sale terminal with the front of the controller accessible is shown. More specifically, when the removable face panel 130 and the keyboard 112 are disengaged from the housing 110, the front of the point of sale control system 210 is exposed, thus providing easy access to the front of the point of sale control system 210 for servicing. The top portion 220 of the housing on which the keyboard 112 is attached provides a form factor that corresponds to the form factor of the keyboard. The top portion 220 of the terminal housing 110 also includes a plurality of recesses 230 into which projections on the bottom of the keyboard 112 fit to secure the keyboard 112 to the top portion 220 of the terminal housing 110.

Figure 3:
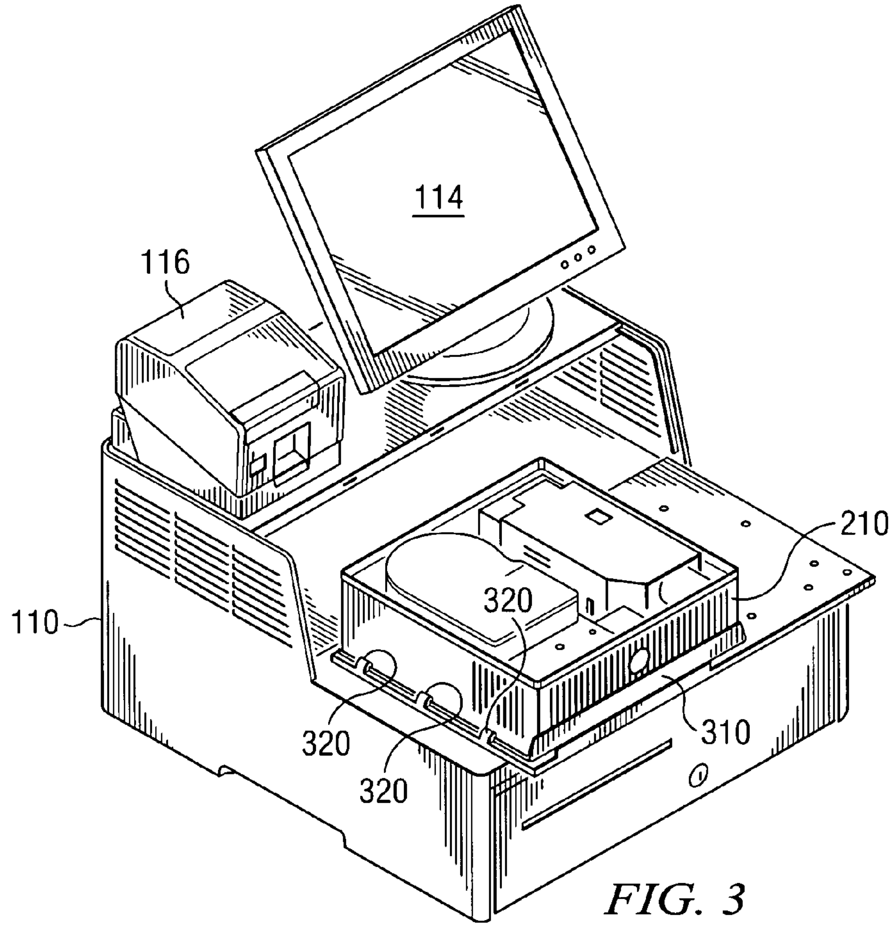
FIG. 3 shows a perspective view of a point of sale terminal with the controller system extended.

Referring to FIG. 3, a perspective view of a point of sale terminal 100 with the controller system 210 extended is shown. More specifically, the controller system 210 is attached to a sliding drawer or sled 310. The sliding sled 310 enables the controller system 210 to extend beyond the top of the terminal housing 110 so that the front, rear and top of the controller system are easily accessible. Because the controller system 210 extends beyond the top of the terminal housing 110, the top of the controller system 210 may be easily removed to provide access to the internal components of the controller system 210.

The sliding sled 310 includes a plurality of projections 320 that controller system 210 to be attached to the sliding sled 310. The projections may be configured so that the controller system 210 may be snapped onto the sliding sled 310. The projections may also be configured so that the controller system 210 may be removed from the sled without any tools.

Figure 4:
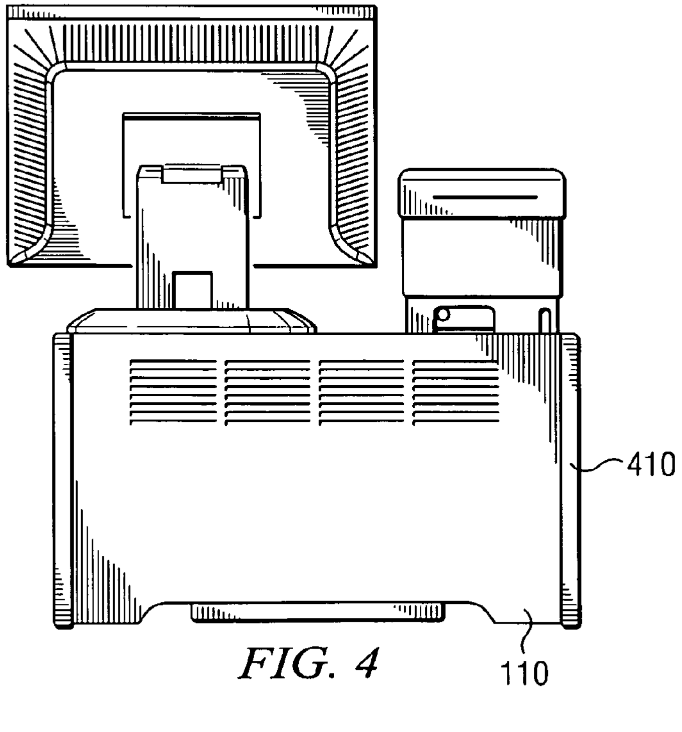
FIG. 4 shows a rear view of a point of sale terminal.

Referring to FIG. 4, a rear view of a point of sale terminal 100 is shown. More specifically, the point of sale terminal 100 includes a rear panel 410 that removably attaches to the point of sale terminal housing 110.

Figure 5:
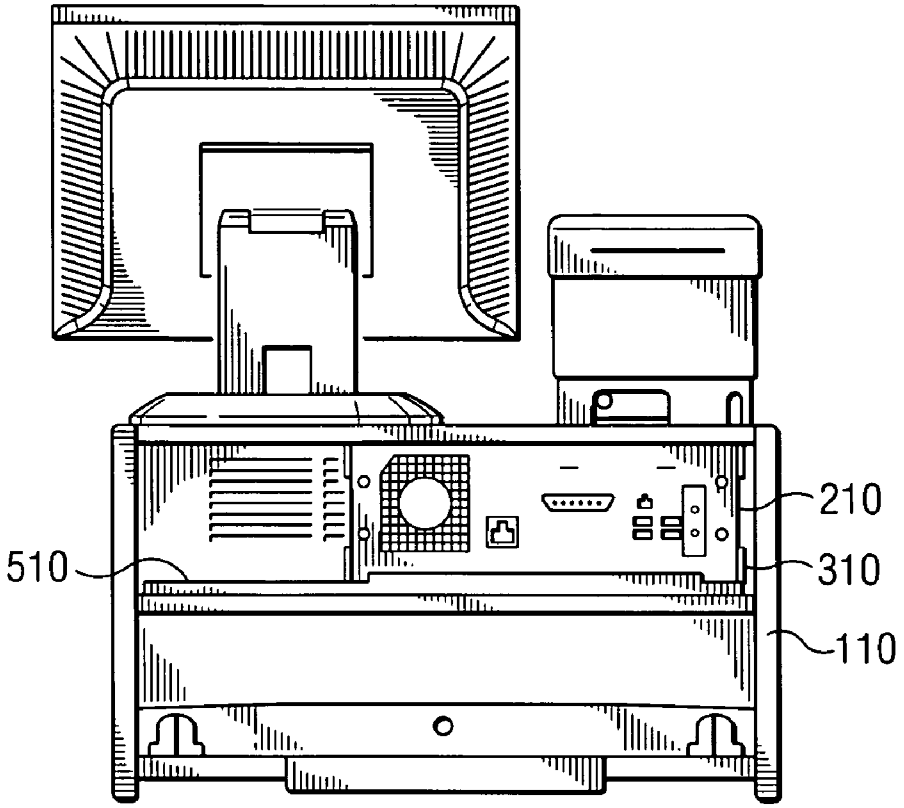
FIG. 5 shows a rear view of a point of sale terminal with the controller accessible.

Referring to FIG. 5, a rear view of a point of sale terminal 100 with the controller accessible is shown. More specifically, when the rear panel 410 is removed, the rear system controller 210 (along with the cable connections of the system controller 210) is readily accessible. The sliding sled 310 on which the system controller 210 rests is attached to a shelf 510 within the terminal housing 110. The shelf 510 allows the system controller 210 to rest above the cash drawer 120. When the rear panel 410 is removed, the rear portion of the cash drawer 120 is also accessible for service.

Figure 6:
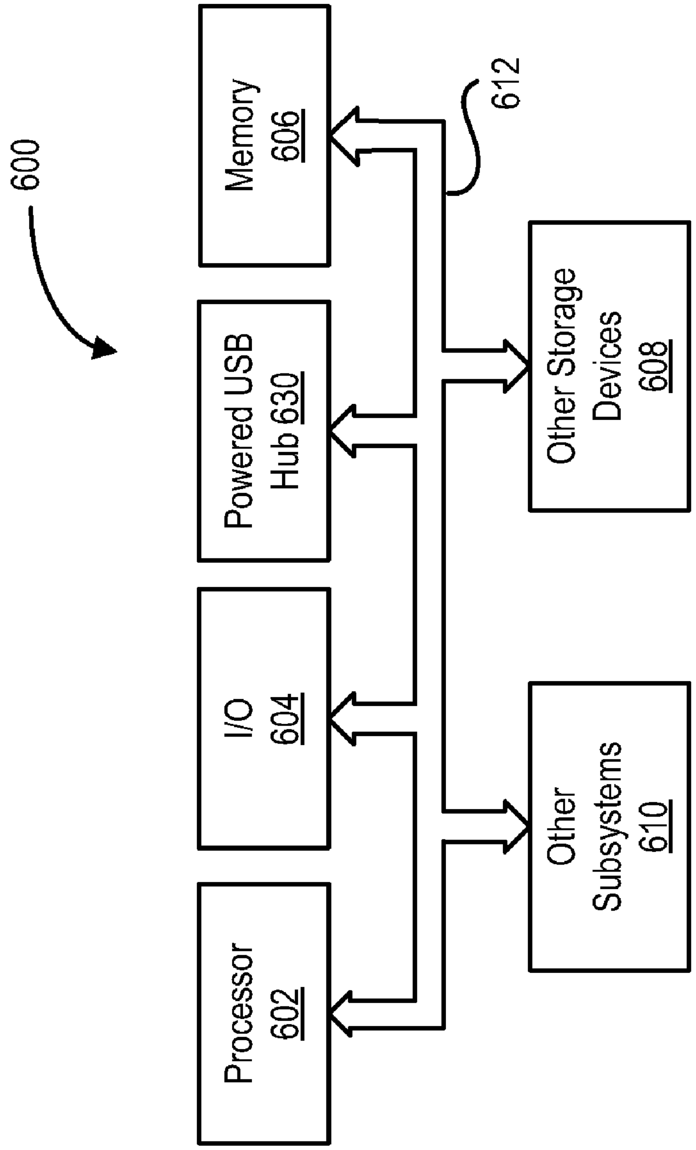
FIG. 6 shows a schematic block diagram of an information handling system for use within a point of sale terminal.

Referring briefly to FIG. 6, a system block diagram of an information handling system 600 is shown. The information handling system 600 is an example the controller system 210 included within the point of sale terminal 100. The information handling system 600 includes a processor 602, input/output (I/O) devices 604, such as the display 114, the keyboard 112 as well as a mouse and associated controllers, non-volatile memory 604 such as a hard disk and drive, and other storage devices 608, such as a floppy disk and drive and other memory devices, and various other subsystems 610, all interconnected via one or more buses 612. The information handling system 600 also includes a powered USB hub 630.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A point of sale terminal comprising a terminal housing, the terminal housing including a controller portion and a cash drawer portion;

a sliding sled coupled to the terminal housing, the sliding sled residing within the controller portion of the terminal housing, the sliding sled sliding between a first position and a second position, the first position being within the controller portion of the terminal housing and the second position being without the controller portion of the terminal housing; and, a system controller coupled to the sliding sled such that when the sliding sled is without the controller portion of the terminal housing, the system controller is exposed for service.

2. The point of sale terminal of claim 1 wherein the sliding sled includes projections, the projections removably attaching the system controller to the sliding sled.

3. The point of sale terminal of claim 1 wherein the system controller includes an information handling system.

4. The point of sale terminal of claim 1 wherein the system controller includes a powered universal serial bus (USB) hub.

5. The point of sale terminal of claim 1 further comprising:

a rear panel coupled to the terminal housing, the rear panel being removable to provide access to a rear of the controller portion and the cash drawer portion of the terminal housing.

6. The point of sale terminal of claim 1 further comprising:

a face panel coupled to the terminal housing, the face panel being removable to provide access to a front of the controller portion of the terminal housing and to provide the sliding sled access to the second position.

7. The point of sale terminal of claim 1 further comprising:

a keyboard coupled above a portion of the cash drawer portion of the terminal housing, the keyboard being removable to provide the sliding sled access to the second position.

8. An information handling system comprising a terminal housing, the terminal housing including a controller portion and a cash drawer portion;

a sliding sled coupled to the terminal housing, the sliding sled residing within the controller portion of the terminal housing, the sliding sled sliding between a first position and a second position, the first position being within the controller portion of the terminal housing and the second position being without the controller portion of the terminal housing; and, a system controller coupled to the sliding sled such that when the sliding sled is without the controller portion of the terminal housing, the system controller is exposed for service.

9. The information handling system of claim 8 wherein the sliding sled includes projections, the projections removably attaching the system controller to the sliding sled.

10. The information handling system of claim 8 wherein the system controller includes a processor and a memory coupled to the processor.

11. The information handling system of claim 8 wherein the system controller includes a powered universal serial bus (USB) hub coupled to the processor.

12. The information handling system of claim 8 further comprising:

a rear panel coupled to the terminal housing, the rear panel being removable to provide access to a rear of the controller portion and the cash drawer portion of the terminal housing.

13. The information handling system of claim 8 further comprising:

a face panel coupled to the terminal housing, the face panel being removable to provide access to a front of the controller portion of the terminal housing and to provide the sliding sled access to the second position.

14. The information handling system of claim 8 further comprising:

a keyboard coupled above a portion of the cash drawer portion of the terminal housing, the keyboard being removable to provide the sliding sled access to the second position.

15. A point of sale terminal comprising a terminal housing, the terminal housing including a controller portion and a cash drawer portion;

a sliding sled coupled to the terminal housing, the sliding sled residing within the controller portion of the terminal housing, the sliding sled sliding between a first position and a second position, the first position being within the controller portion of the terminal housing and the second position being without the controller portion of the terminal housing;

a rear panel coupled to the terminal housing, the rear panel being removable to provide access to a rear of the controller portion and the cash drawer portion of the terminal housing;

a face panel coupled to the terminal housing, the face panel being removable to provide access to a front of the controller portion of the terminal housing and to provide the sliding sled access to the second position; and, a system controller coupled to the sliding sled such that when the sliding sled is without the controller portion of the terminal housing, the system controller is exposed for service.

* * * * *